United States Patent [19]

Chung et al.

[11] Patent Number: 5,181,210

[45] Date of Patent: Jan. 19, 1993

[54] ELECTRICALLY TUNABLE FIBER RING LASER

[75] Inventors: Yun C. Chung, Aberdeen; David J. DiGiovanni, Scotch Plains; Julian Stone, Rumson; James W. Sulhoff, Ocean; John L. Zyskind, Shrewsbury, all of N.J.

[73] Assignee: AT&T Bell Laboratories, Murray Hill, N.J.

[21] Appl. No.: 820,110

[22] Filed: Jan. 13, 1992

Related U.S. Application Data

[63] Continuation of Ser. No. 706,135, May 28, 1991, Pat. No. 5,132,976.

[51] Int. Cl.[5] ............................................. H01S 3/30
[52] U.S. Cl. ......................................... 372/6; 372/19; 372/20
[58] Field of Search ................................. 372/6, 19, 20

[56] References Cited

U.S. PATENT DOCUMENTS 5,050,183  9/1991  Duling ..................................... 372/6

Primary Examiner—John D. Lee
Assistant Examiner—Robert E. Wise
Attorney, Agent, or Firm—B. H. Freedman

[57] ABSTRACT

A compact all-fiber, electrically tunable ring laser includes a diode-pumped erbium-doped fiber amplifier. The frequency of the laser is tuned by a fiber Fabry-Perot (FFP) etalon that is electrically tuned. An in-line optical isolator is used in conjunction with the FFP to eliminate undesired reflections. A second FPP with a narrow free spectral range (FSR) can be used in conjunction with a first FFP with a wide FSR.

4 Claims, 6 Drawing Sheets

ELECTRICALLY TUNABLE FIBER RING LASER

This is a continuation of application Ser. No. 07/706,135 filed May 28, 1991 now U.S. Pat. No. 5,132,976.

FIELD OF THE INVENTION

This invention relates generally to ring lasers and, in particular, to electrically tunable optical fiber ring lasers.

BACKGROUND OF THE INVENTION

Tunable lasers have applications in a wide variety of fields, including optical communications, optical fiber sensors, and spectroscopy. The availability of high performance erbium-doped fiber (EDF) amplifiers and lasers pumped with modest power now offers the possibility, with a suitable tuning element, of designing compact, diode-laser pumped, electrically tunable fiber lasers for the wavelengths near 1.5 μm, which are of interest for optical fiber communications. Erbium doped fiber amplifiers and lasers are described, for example by W. L. Barnes, P. R. Morkel, L. Reekie and D. N. Payne, "High-Quantum-Efficiency $Er^{3+}$ Fiber Lasers Pumped at 980 nm", Opt. Lett, Vol. 14, p. 1002 (1989), by E. Desurvire, C. R. Giles, J. R. Simpson and J. L. Zyskind, "Efficient Erbium-Doped Fiber Amplifier at a 1.53-μm Wavelength with a High Output Saturation Power", Opt. Lett., Vol. 14, p. 1266 (1989), and by J. L. Zyskind, D. J. DiGiovanni, J. W. Sulhoff, P. C. Becker and C. H. Brito Cruz, "High Performance Erbium-Doped Fiber Amplifier Pumped at 1.48 μm and 0.97 μm", in Technical Digest on Optical Amplifiers and Their Applications, 1990 (Optical Society of America, Washington, D.C., 1990), Vol. 13, p. PdP6-1.

A practical tunable laser should be compact and of simple design. Its pump requirements should be modest, and the laser should be electrically tunable. Prior art ring lasers have involved hybrid technologies and used tuning elements which were bulky and had strong polarization dependence requiring complicated design and complicated operation. These prior art devices also had high losses that result in low slope efficiency and thus high pump requirements. Accordingly, to date, a ring laser with a satisfactory tuning element has not been described.

SUMMARY OF THE INVENTION

A compact all-fiber, electrically tunable ring laser includes, in a preferred embodiment, a diode-pumped erbium-doped fiber amplifier which introduces optical gain into an optical fiber ring. The gain exceeds the optical loss of the fiber ring, so as to produce light by laser action. Other arrangements for introducing optical gain into the fiber ring may also be used. The frequency of the laser light is tuned independent of polarization, by a fiber Fabry-Perot (FFP) etalon, i.e., a Fabry-Perot etalon in which two mirrors are made by depositing coatings on the polished ends of input and output single mode optical fibers. The mirrors are separated by an air gap and, in certain cases, a length of single mode fiber. The FFP is electrically tuned by applying a control signal which has the effect of adjusting the length of the air gap. An in-line optical isolator is used in conjunction with the FFP, to permit circulation of light in the ring in only one direction.

One embodiment of our ring laser was a compact, electronically tunable, all-fiber device that had a low threshold ($I_{th} < 3$ mW), and could be tuned from 1.525 to 1.586 μm with a variation in power of less than 3.5 dB. Because the FFP has much lower losses (by 3 dB or more) than other tuning elements, the resulting modest pump requirements enable the laser to be powered by semiconductor diode laser pumps. The laser had increased efficiency and output power, as compared to prior art arrangements. The polarization independence of the FFP permits a simple design, requiring only adjustment of the FFP bias to tune the laser over its full tuning range.

In certain applications, a second FFP with a narrow free spectral range (FSR) can be used in conjunction with a first FFP with a wide FSR.

DETAILED DESCRIPTION

Figure 1:
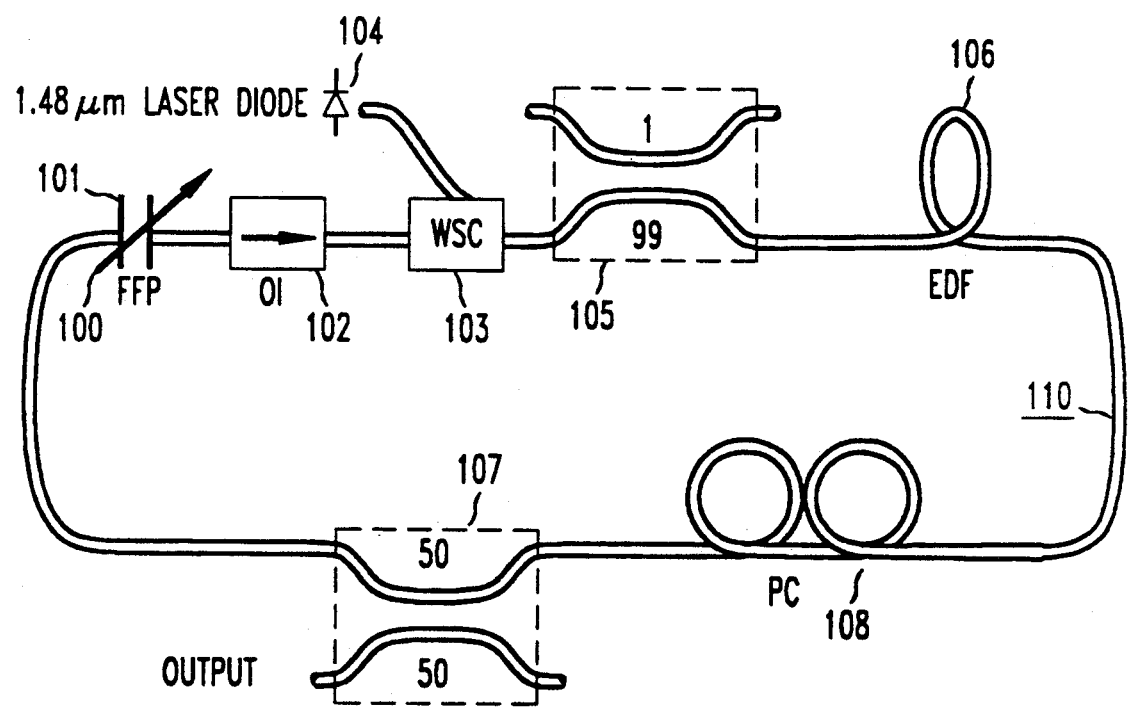
FIG. 1 is a schematic diagram of a tunable, diode pumped fiber laser arranged in accordance with our invention, using a fiber Fabry-Perot etalon as an electrical tuning element.

FIG. 1 illustrates an erbium doped fiber (EDF) ring laser using a fiber Fabry-Perot (FFP) etalon as an electrical tuning element in accordance with our invention. Many of the components shown in FIG. 1 are similar to those shown in an article "An Electronically Tunable Fiber Laser with a Liquid Crystal Etalon Filter as the Wavelength Tuning Element", M. W. Maeda et al., IEEE Photonics Technology Letters, Vol 2, No. 11, Nov. 1990, p. 787, in which a liquid-crystal etalon filter was used.

In FIG. 1, fiber Fabry-Perot (FFP) etalon 101 may be arranged as described in "Pigtailed High Finesse Tunable Fibre Fabry-Perot Interferometers with Large, Medium and Small Free Spectral Ranges, J. Stone et al., Electronics Letters, Vol. 23, p. 781 (1987). Generally speaking, FFP 101 is a Fabry-Perot etalon in which two mirrors are made by depositing coatings on the polished ends of input and output single mode optical fibers. The mirrors are separated by an air gap and in certain cases a length of single mode fiber. The FFP is electrically tuned by applying a control signal which has the effect of adjusting the length of the air gap.

FFP 101 may have a free spectral range of 66 nm, a finesse of 55 and an insertion loss of 0.7 dB on resonance. By varying the control signal on control line 100, FFP 101 controls the wavelength of light in a fiber ring laser cavity which consists of an optical fiber ring designated generally as 110. Ring 110 includes an erbium-doped fiber (EDF) amplifier 106 for introducing optical gain into ring 110 that exceeds the optical loss of ring 110. In one embodiment, EDF 106 had a length of 30 m, a cut-off wavelength of 1.0 μm, a core diameter of 2 μm and an index difference Δn=0.045. The core had an Er concentration of 100 ppm and was co-doped with Ge and Al. A wavelength selective coupler 103 couples pump light emitted by a 1.48 μm laser diode 104 into a laser-machined fiber micro-lens, and then into EDF amplifier 106.

It is to be noted that a fiber Fabry-Perot etalon such as FFP 101 cannot be used in a standing wave resonator because it will reflect wavelengths outside the pass band and act as a resonator end-mirror for these wavelengths, in a ring cavity as shown in FIG. 1. However, with an optical isolator 102, light can circulate in only one direction in the ring. Optical isolator 102 assures wavelength selectivity of the ring cavity by suppressing standing wave laser modes generated by reflections from the FFP at wavelengths outside the FFP pass band. The formation of a resonator for wavelengths outside the FFP pass band is thus prevented, and laser action should occur only within the FFP pass band, as is desired.

In the arrangement of FIG. 1, EDF amplifier 106 is followed by a 50:50 fused fiber coupler 107 acting as an output coupler. A polarization controller 108 is included in ring 110 for the purpose of maximizing output power. If desired, a 99:1 fused fiber coupler 105 may also be included in ring 110 to permit monitoring of the coupled pump power.

While FIG. 1 illustrates the positioning of FFP 101 after (downstream of) output coupler 107, it is to be noted that in some circumstances it may be desirable to position FFP 101 elsewhere in the fiber ring, such as immediately before (upstream of) coupler 107. In such event, the output power will be somewhat reduced, because of the loss introduced in fiber ring 110 by FFP 101 itself. However, the benefit of this arrangement is that FFP 101 will operate as an output filter to prevent spontaneous emission from erbium doped fiber amplifier 106 at undesired wavelengths from reaching the output coupler.

Figure 2:
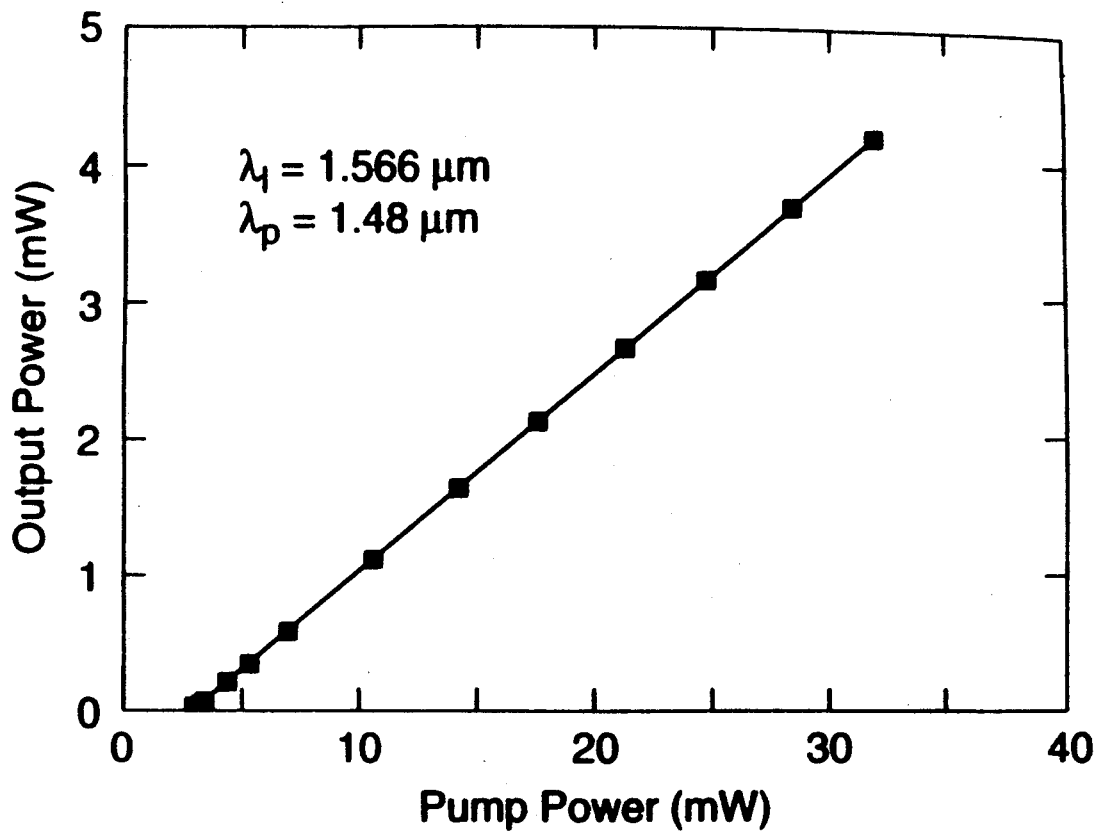
FIG. 2 is a graph showing, for the arrangement of FIG. 1, the relationship between pump power versus laser output power.
Figure 3:
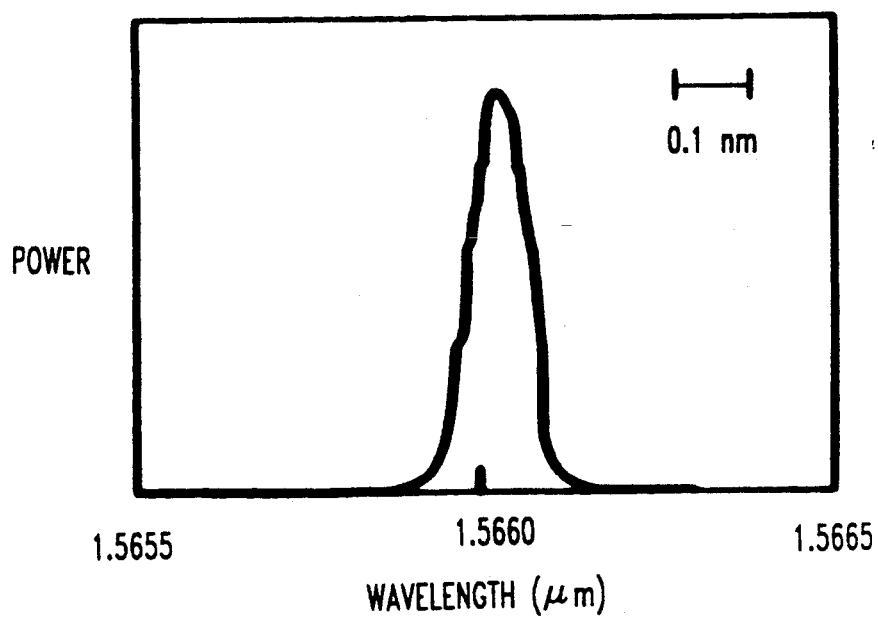
FIG. 3 shows the laser line measured with 0.1 nm resolution, and a linear power scale.

In experiments testing a ring laser arranged as shown in FIG. 1 with injection currents up to 300 mA, as much as 32 mW of pump power was launched into the ring laser. FIG. 2 is a graph showing the relationship between pump power versus laser output power. The light-light curve was measured for a wavelength of 1.566 μm. The threshold is 2.9 mW. The slope efficiency is 0.15, with an output power of 4.2 mW for 32 mW of pump power. FIG. 3 shows the laser line measured with 0.1 nm resolution. Another implementation using a higher efficiency erbium-doped fiber gain medium with a length of only 1.1 m had a slope efficiency of 26 percent, a maximum output power of 15 mW, and a tuning range exceeding 70 nm.

Figure 4:
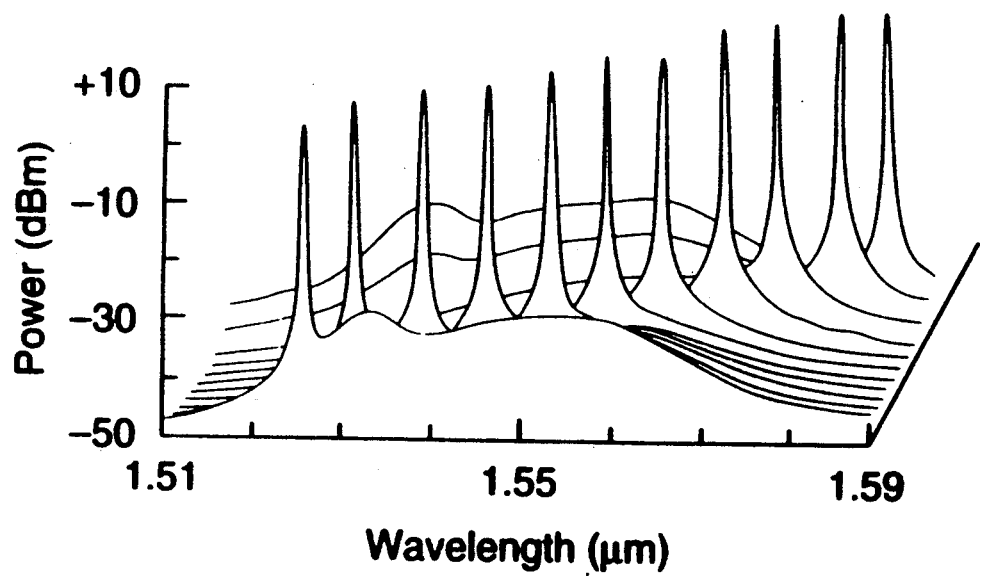
FIG. 4 is a graph of the output spectra for laser wavelengths between 1.526 μm and 1.584 μm; in this figure, measurement resolution is 0.5 nm.

The tuning characteristics of the laser of FIG. 1 are shown in FIG. 4, which is a graph of the output spectra for laser wavelengths between 1.526 μm and 1.584 μm. The spectral power density of the laser line exceeds that at other wavelengths in the erbium gain spectrum by more than 50 dB over most of the tuning range (correcting for the 0.5 nm measurement resolution and laser line width <0.1 nm).

Figure 5:
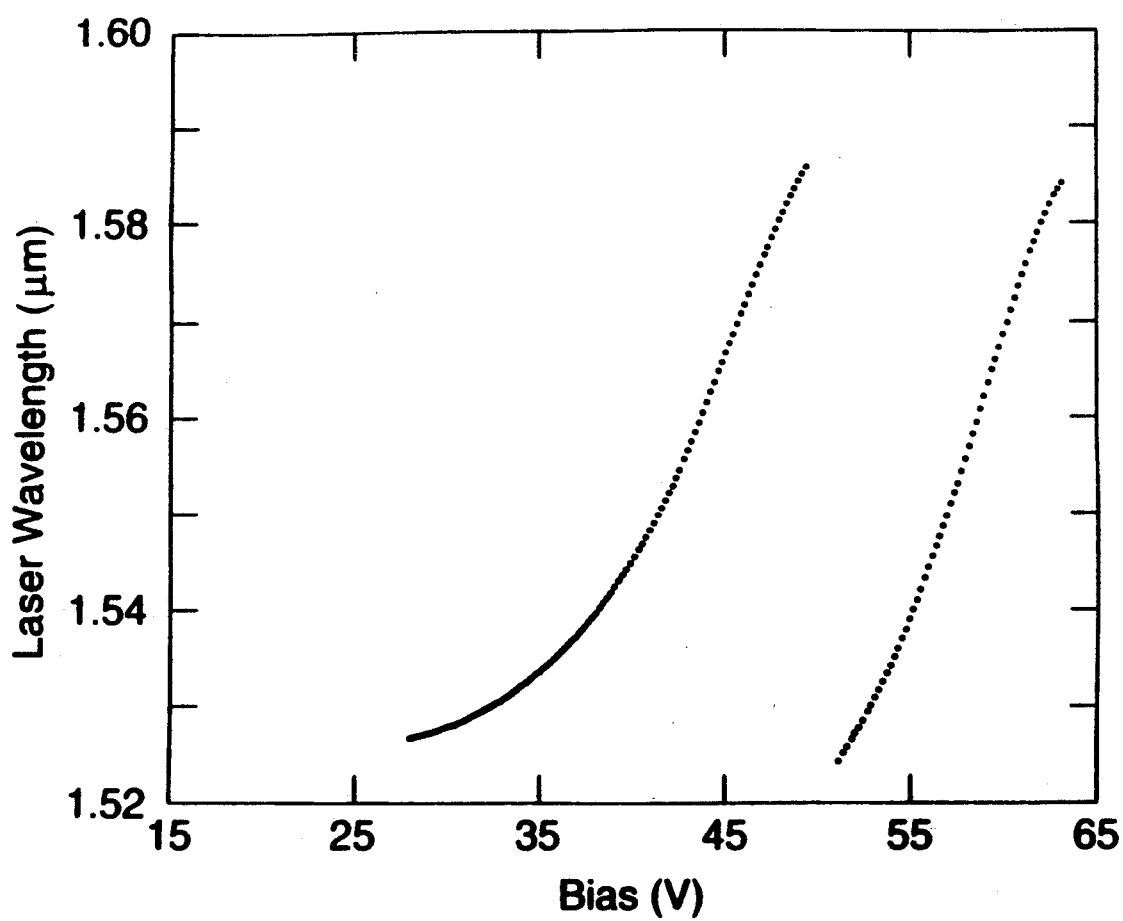
FIG. 5 is a graph of laser wavelength versus FFP bias; this figure also shows a detail of first order tuning near 1.531 μm.
Figure 6:
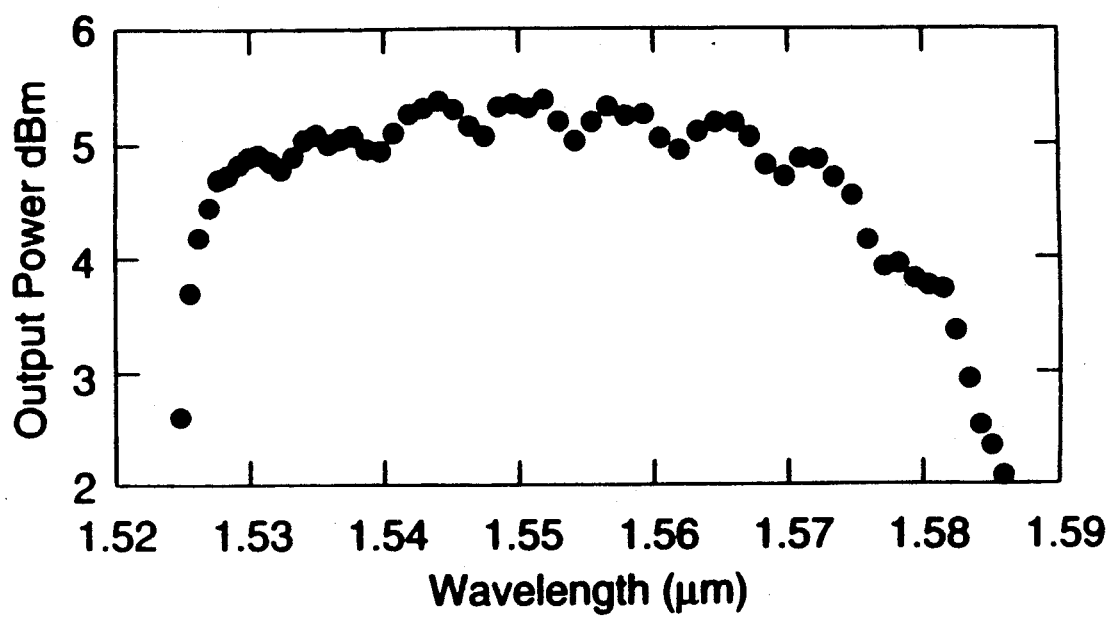
FIG. 6 is a graph of laser output power versus laser wavelength.

As can be seen from FIG. 5, which is a graph of laser wavelength versus FFP bias as applied to control line 100, the tuning range exceeds 60 nm, from 1.525 μm to 1.586 μm. Over this range, the power of the laser line varies by less than 3.5 dB, as shown by FIG. 6, which is a graph of laser output power versus laser wavelength. The laser wavelength can be tuned continuously over the 60 nm tuning range by adjusting only the bias of the FFP, without the need to adjust the polarization. The continuous tuning is demonstrated over a portion of the gain spectrum in the inset to FIG. 5, which shows first order tuning near 1.531 μm. It is to be noted that the change in FFP bias necessary to tune over the full 60 nm range in the second order is about 10 V. In the first order, the laser wavelength initially changes slowly with bias but beyond the starting bias of about 50 V, the dependence of wavelength on bias is similar. The departures of the tuning curve from linearity arise from effects of FFP loading friction and the shape of the FFP piezoelectric translator hysteresis curve at low bias ($V_{FFP} < 50$ V), and from gain pulling near the limits of the tuning range.

As a result of the low loss of FFP etalons such as FFP 101, and the low threshold of erbium doped fiber amplifiers such as EDF amplifier 106, the FFP EDF ring laser of FIG. 1 has substantially improved threshold power, slope efficiency, output power and tuning range compared to other reported designs for tunable, erbium-doped fiber ring lasers. The FFP EDF ring laser is thus especially well suited for pumping by semiconductor diode lasers. The polarization independence of FFP 101 permits simpler operation with continuous tuning over 60 nm by adjusting only the FFP bias. As an all fiber, polarization independent diode pumped device, the FFP EDF is inherently simpler and more compact.

Figure 7:
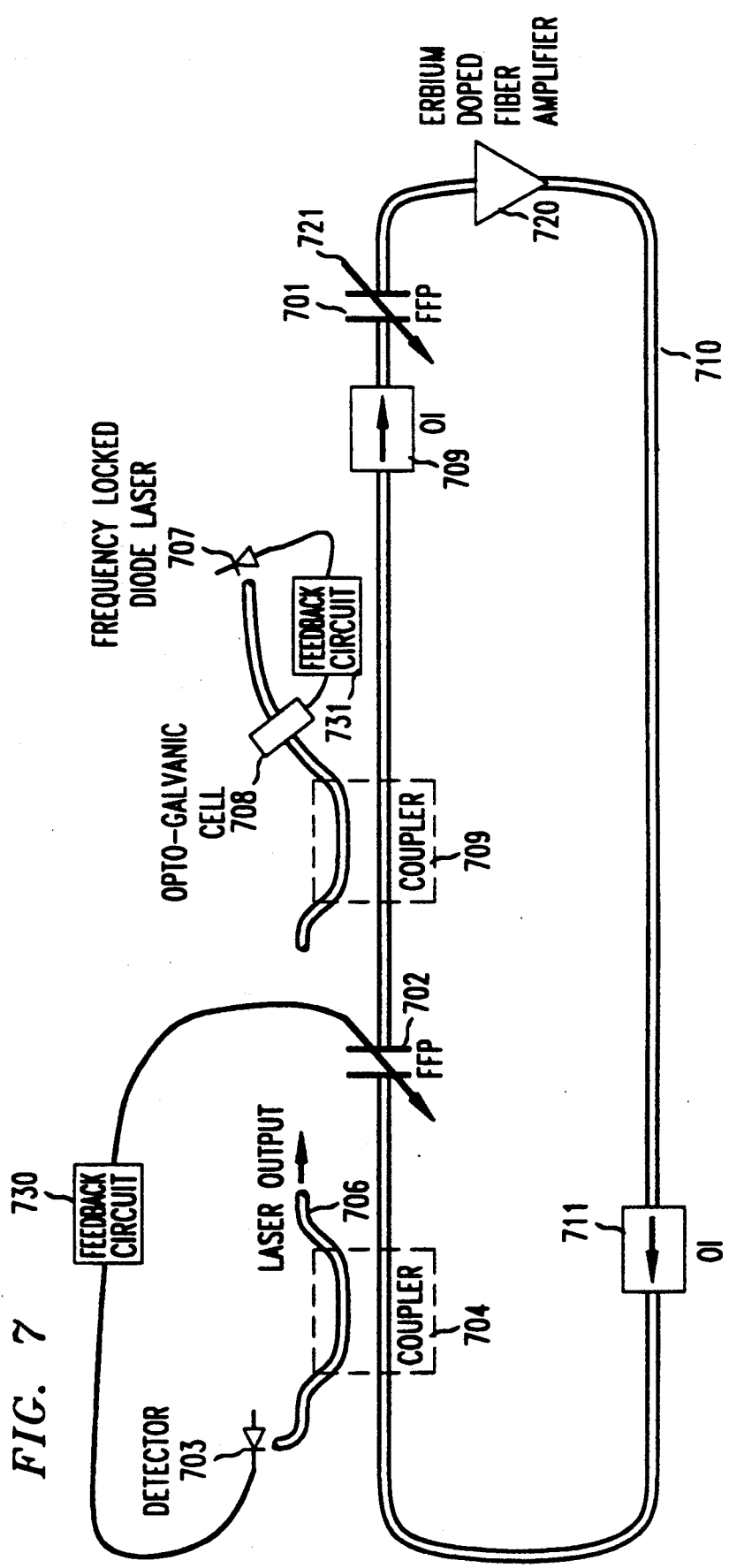
FIG. 7 is a schematic diagram illustrating the use of two FFP etalons in a ring laser, one with a wide free spectral range (FSR) and the other with a narrower FSR.

In accordance with another embodiment of our invention, illustrated in FIG. 7, we have determined that the low loss and and polarization insensitivity of fiber Fabry-Perot filters, as well as the wide range of free spectral ranges with which they can be made, allow combining two FFP filters 701 and 702 in tandem to achieve single longitudinal mode operation, yielding an electronically tunable laser that has a narrow spectral laser line width. One FFP 701 is arranged to have a wide free spectral range (FSR) to tune across the erbium gain spectrum, and the other FFP 702 is arranged to have a narrow FSR and passband, to select among the longitudinal modes of the ring cavity. The laser operation is stabilized by locking one of the comb of frequencies of the mode-selecting, narrow FSR FFP 702 to the emission wavelength of a frequency locked diode laser 707, the frequency of which is locked using an opto-galvanic cell 708. The use of an opto-galvanic cell for frequency stabilization in a semiconductor laser is illustrated in U.S. Pat. No. 4,932,030 issued to Y. C. Chung on Jun. 5, 1990. The frequency of FFP 701 is controlled by a signal input on control line 721.

Light generated by diode laser 707 is sensed by opto-galvanic cell 708, and fed back to diode laser 707 via an electrical signal generated in a feedback circuit 731 so as to lock its output at a stable frequency. The output of diode laser 707 is also coupled into optical fiber ring 710 via coupler 709, passed through FFP 702, output from the fiber ring via coupler 704 and frequency detected by a photodetector diode 703. The electrical output of diode 703, which is determined as a function of the stable frequency produced by diode laser 707, is applied to the control input of FFP 702 via a feedback circuit 730, thereby controlling its frequency. Notice that coupler 704 also provides the output 706 of the ring laser.

The laser of FIG. 7 also includes an erbium doped fiber amplifier 720, which may be arranged as described in the references cited above, and two optical isolators 710 and 711, which prevent unwanted reflections. Two isolators are required, one for each FFP, since unwanted reflections may be generated by each of the FFPs. As in the embodiment of FIG. 1, a gain-producing means other than an erbium doped fiber amplifier may also be used.

Persons skilled in the art will appreciate that numerous modifications and adaptations of the present invention may be made without departing from the spirit of our invention. Accordingly, it is intended that the invention be limited only by the appended claims.

We claim:

1. A ring laser, comprising:
an optical fiber ring;
means for introducing optical gain into said optical fiber ring, said gain exceeding the optical loss of said optical fiber ring, so as to produce light by laser action; and
means for tuning the frequency of said laser light;
characterized in that said frequency tuning means includes a first fiber Fabry-Perot etalon operating as a mode selector and a second fiber Fabry-Perot etalon acting as a tuning element.

2. An electrically tunable fiber laser, comprising (1) an optical fiber ring; (2) an amplifier for providing gain to laser light circulating in said optical fiber ring; and (3) means in said fiber ring for maintaining said laser light at a desired frequency in response to an electrical control signal,
wherein said last mentioned means includes first and second serially connected fiber Fabry-Perot tuning elements.

3. A ring laser, comprising:
an optical fiber ring;
means for introducing optical gain into said optical fiber ring, said gain exceeding the optical loss of said optical fiber ring, so as to produce light by laser action; and
means for tuning the frequency of said laser light;
characterized in that said frequency tuning means includes a first filter operating as a mode selector and a second filter acting as a tuning element.

4. An electrically tunable fiber laser, comprising (1) an optical fiber ring; (2) an amplifier for providing gain to laser light circulating in said optical fiber ring; and (3) means in said fiber ring for maintaining said laser light at a desired frequency in response to an electrical control signal,
wherein said last mentioned means includes first and second serially connected filtering elements, said first filtering element operating as a mode selector and said second filtering element operating as a tuning element.

* * * * *